Nov. 26, 1968  G. J. OLNEY  3,412,736

FARM PRODUCT SEPARATOR

Filed Jan. 10, 1966  3 Sheets-Sheet 1

INVENTOR.
GEORGE J. OLNEY
BY  *John P. Murphy*
ATTORNEY

INVENTOR.
GEORGE J. OLNEY
BY
*John P. Murphy*
ATTORNEY

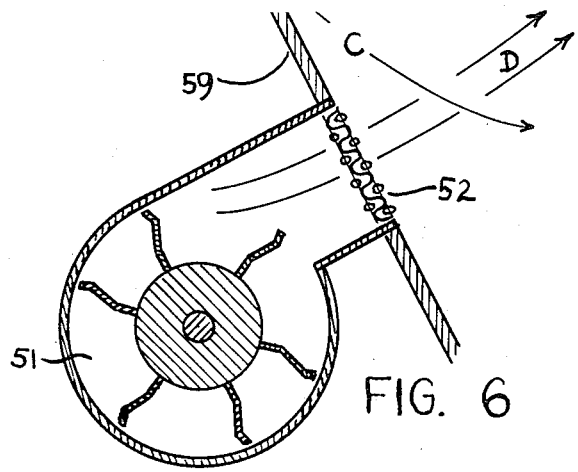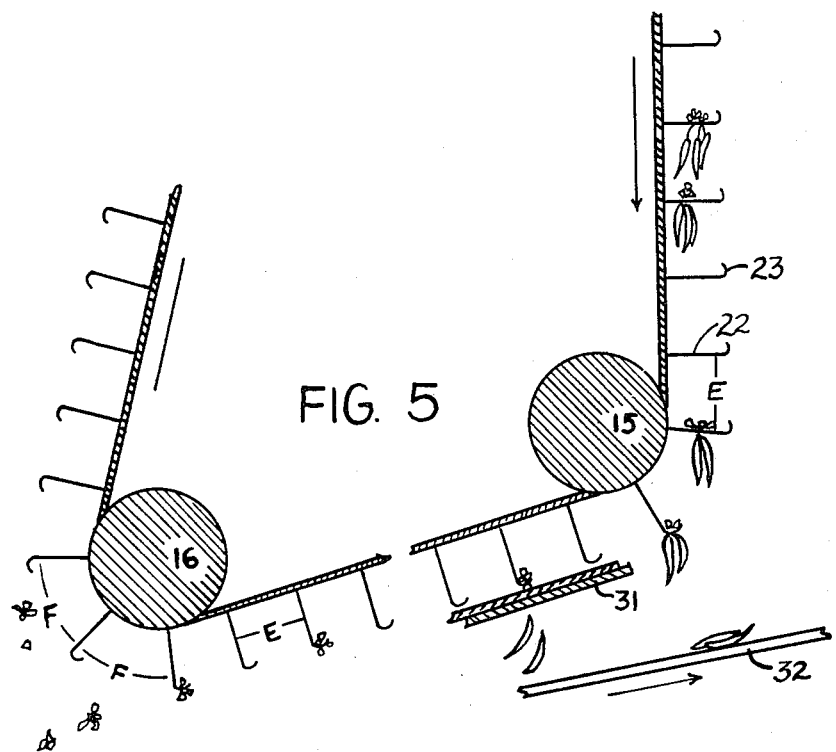

United States Patent Office 3,412,736
Patented Nov. 26, 1968

1

3,412,736
FARM PRODUCT SEPARATOR
George J. Olney, Westernville, N.Y. 13486
Filed Jan. 10, 1966, Ser. No. 519,756
8 Claims. (Cl. 130—30)

This invention relates to the processing of farm products, and more particularly to the separating of product in clusters and from certain "trash."

The processing of most farm products from the vine or plant to the marketable product is all done by mechanical means. Certain products, such as for instance beans, are removed from the vines by large wire brushes which, in many cases, tear the beans away in clusters of from two to six per stem. The following process then removes the stem and blossom end from each individual vegetable, and it is here that each one must be separate, i.e., not part of a cluster. Otherwise much hand work is necessary to separate the product which is in a cluster, with the attendant higher cost of processing and reduction of productivity.

Present types of cluster separators are based on passing a continuous stream of beans through large cylinders made of perforated sheet metal with a plurality of short baffles inside. Two chains spaced about twelve inches apart, with wires set between them, are set at the extreme top of the cylinder on the inside. Baffles fixed to the inside of the cylinder lift up the beans and drop them to the wires. The clusters catch on the wires. Clusters stopping on the top "run" of the chain are cut off at one end, while clusters catching on the bottom "run" are cut off at the opposite end. Both cut off beans and cut ends fall back into the good product. Another apparatus uses a knife which travels through the cylinder to trim the product and stems while on the hooks. Again, the stem ends and product are deposited back in the good product in the cylinder. These cylinders have a maximum capacity of five tons per hour, and have serious jam-ups due to a mass of product and trash plugging the cutting blades.

Accordingly, it is an object of this invention to provide means for separating clusters from single product prior to trimming.

Another object is to retrieve only the trimmed product.

Another object is to discharge the stems and other trash away from the retrieved product.

Another object is to introduce a secondary operation for guaranteeing the completeness of separation and trimming.

Another object is to increase substantially the amount of product that can be processed in an hour.

Another object is to prevent machine plugging.

In carrying out the objects of the invention there is provided a product separator having a primary separating zone and means therein for catching clusters and permitting single product to pass through, primary cutting means for trimming the clusters, primary retrieval means for retrieving single and trimmed product, the trash being discharged separately. A secondary means may be provided with a secondary separating zone and means for separating other trash, secondary cutting means, and final discharge of product to subsequent processing.

The objects and advantages of the invention will be more fully understood from the following description, when read with reference to the accompanying drawings, in which.

2

Figure 3:
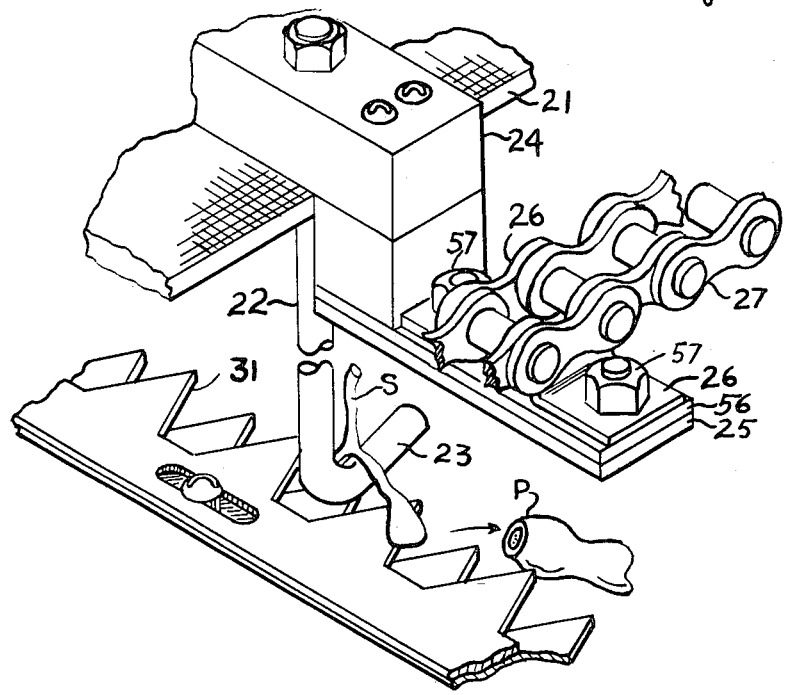

FIG. 3 is an enlarged fragmentary view, with parts cut away, showing a trimming operation of the invention.

Figure 4:
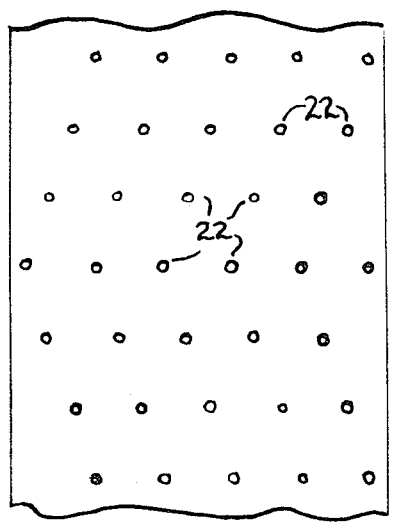

FIG. 4 is a fragmentary view illustrating a detail of the hooked rod pattern on the belt.

FIG. 5 is a fragmentary enlarged schematic view of the separating rods passing around a sprocket, in part.

FIG. 6 is a fragmentary enlarged schematic view of the secondary operation showing the blower whereby the product is dispersed.

The basic principle of the invention resides in the method and apparatus for controlled dispersion of product to a separating zone through which single product will fall to a retrieval zone, and in which clusters will be caught by hooks that drop freely downwardly in the same direction as the falling clusters, and thence be carried to trimming operation. Following the trimming operation, the resulting single product will be retrieved and the trash discharged.

Other farm products could require processing in this manner. However, the invention will be described with respect to an embodiment suited particularly to the processing of beans; hence the word "bean" will hereinafter represent any product.

Figure 1:
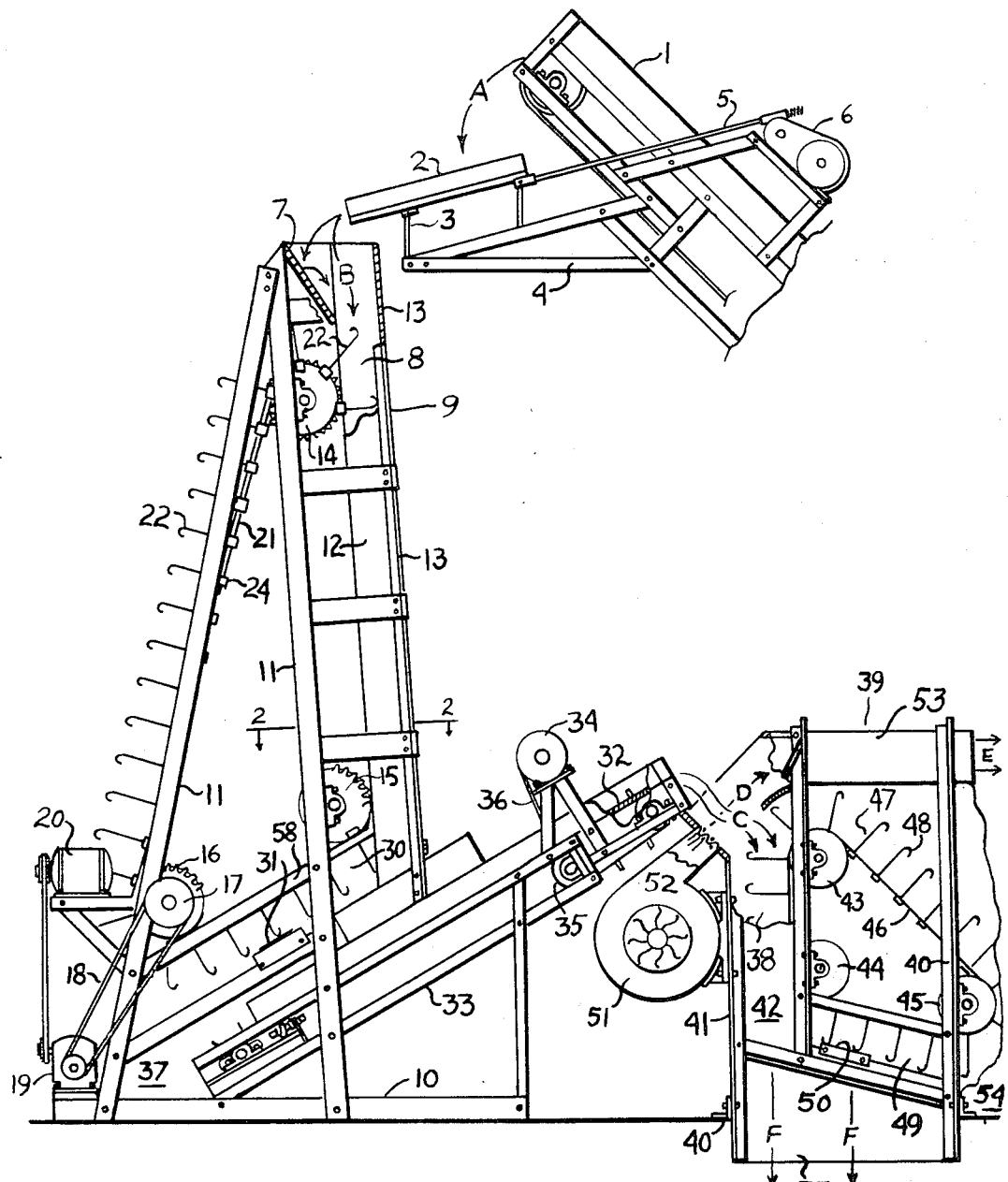
FIG. 1 is a side elevation of an embodiment of the invention.

Referring to FIG. 1, any substantially conventional elevator conveyor 1 is utilized to elevate the beans from a receiving area for processing, discharging same as at arrow A. A vibrating dispersal plate 2 is carried on pivotal legs 3 fastened to any suitable support frame 4; and is operatively connected to a source of oscillating power 6 by means of a connecting rod 5. The beans fall onto the dispersal plate 2 and are vibrated in a continuous thin stream from said plate into the primary separating apparatus 9, through an area of about eighteen inches in length, which will be referred to as the accelerating distance.

The apparatus 9 comprises a base framework 10 with such other frame members 11 as are required to support the elements of the apparatus. Upright side members 12 (FIGS. 1 and 2) define a primary separating zone 8, as will appear. Upper idler sprockets 14 and lower idler sprockets 15 are carried by the frame 11 adjacent the ends of separating zone 8. Each pair is carried such as is shown for sprockets 15 on shaft 28 and bearing blocks 29 in FIG. 2. A drive pulley 17 is associated with drive sprockets 16, also carried by frame 11 and receiving power from a conventional variable speed gearmotor 19 via any belt or chain 18. The gearmotor 19 is also connected to any electric motor 20. The speed at which sprockets 16 are driven may be varied by controlling the gearmotor 19.

Figure 2:
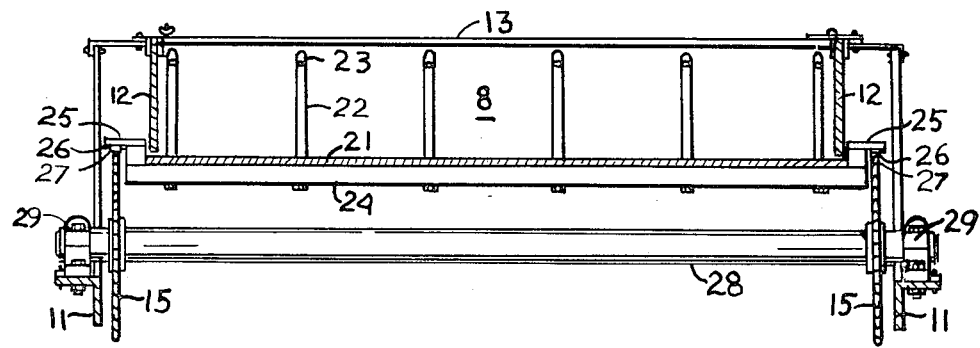
FIG. 2 is an enlarged sectional view taken along the line 2—2 in FIG. 1.

As seen in FIGS. 2 and 3, an endless roller chain 27 is disposed around the sprockets on each side of the frame. At corresponding spaced intervals along each chain 27 a pair of special mounting links 26 with tabs thereon is bolted to a carrier plate 25. Each carrier plate 25 has a stainless steel wear plate 56 attached directly to the top. The two bolts 57 which attach the ends of support bar 24 to the carrier plate 25 (chain attachments R and L with holes on two inch centers) also hold the stainless steel wear plates 56. Underneath the chain on sprockets 15 and 16, a wearing bar 58 is set extending the full length (distance) between the two sprockets 15 and 16. Wear bar 58 is square, so that all four sides may be utilized as wearing surfaces. When one side wears the user turns the bar. Holding bolt holes are drilled through at all four sides of the bar ends (not shown). The stainless steel wear plates 56 on the chain attachment ends, bear directly against the long wear bars 58 so that the bars 25 with the hooks is held in a fixed position with relation to the cutting blade assembly 31. Each carrier plate 25 is fastened to a transverse support bar 24, thus forming an endless succession of transverse bars 24, ladder-fashion, along the chains 27. Disposed on and fastened to the bars 24 is an endless carrier belt 21, which lends stability to the bars 24 and also defines part of the primary separating zone 8, as will appear. Hooked rods 22 are fastened to the bars 24 and extend outwardly from belt 21 at right angles thereto into zone 8. It will be noted that the carrier belt 21 and chains 27 are disposed nearly vertically along the primary separating zone 8 such that the hooked rods 22 extend substantially horizontally from the belt 21 as the belt moves downwardly along the zone 8. Between the lower idler sprocket 15 and the drive sprocket 16 the belts and chains are disposed at an angle so that the apex between the hook 23 and the smooth, elongated portion of each rod 22 is disposed downwardly. Trimming means in the form of a cutter blade assembly 31 is disposed adjacent these apices in the trimming zone 30 below the belt and chains, as will appear. The cutter blade assembly 31, in this embodiment, is any conventional shearing type having a stationary blade and reciprocating blade of the sickle bar type. Trimming means could also be in the form of a band saw. The cutting blade assembly 31 is mounted on adjusting plates so that the user may set the distance between the cutting assembly and the hook ends 23 to suit, usually 1/8 inch to 3/16 inch.

FIG. 3 is illustrative of one hook 23 of a rod 22 with the forked stem S and the product P trimmed therefrom by the action of the cutter blade assembly 31. The stem S remains on the hook 23. It will also be noted that the hooked rods travel around the drive sprocket 16, as shown in FIG. 5, so that the hooks 23 open downwardly toward the discharge zone 37, whereby anything caught on said hooks may fall and be discharged. The belt 21 and the rods 22 travel in a substantially straight line between idler sprocket 14 and idler sprocket 15. The distance E between the rods 22 will be substantially equal. As the belt 21 travels around the idler sprocket 15, each individual rod 22 extends radially from the sprocket 15 and the belt 21. Inasmuch as the hook ends 23 of the rod 22 is at a greater distance radially than the end of the rod 22 attached to the belt 21, and due to the radial positions of the rods 22, a greater distance F does exist between each successive hook end 23 as said rods 22 travel around the idler sprocket 15. This opening up of the rods 22 as they pass around sprocket 15 will clear any mass of beans that may have become clogged on the downward moving rods. In FIG. 3, stem S would thus be discharged toward zone 37.

FIG. 4 illustrates a fragmentary area of the face of belt 21, showing the preferred arrangement of the rods 22. A predetermined pattern of alternate groups of rods arranged in staggered ranks forms a maze of rods 22, providing every possible opportunity to catch the beans as the beans fall in a tortuous path through the downward moving rods 22 (through primary separating zone 8). The pattern of rods 22 is shown in FIG. 4 and is repeated endlessly around the belt 21, such that several such repeat patterns will occur at all times along the segment of belt 21 between sprockets 14 and 15. The primary separating zone 8, therefore, is that area between the side plates 12, between sprockets 14 and 15, and between belt 21 and doors 13.

FIG. 1 further illustrates retrieval conveyor belt 32 carried on a suitable frame 33 and driven conventionally by any motor 34 through belt 36 and pulley 35. Any beans trimmed by cutter blade assembly 31 will fall onto the belt 32 and be conveyed upwardly to the right and towards the direction of arrows C.

Insofar as it is understood that all beans or other product being processed are not uniform in size, some clusters with lighter makeup, as well as some stems, weed blossoms and the like may be passed on through. At this point it may be desirable to perform a secondary separating and trimming function on the retrieved product conveyed on belt 32.

A secondary separating and trimming unit 39 is illustrated in FIG. 1 substantially in alignment with the discharge end of the primary retrieval conveyor 32. This unit comprises any suitable base and frame members 40, upper idler sprocket 43, lower idler sprocket 44, drive sprocket 45 and associated driving mechanism (not shown) and cutter blade assembly 50. An access door 41 may be disposed at the front of the secondary unit 39. This unit 39 also contains a carrier belt 46 and rods 47 with hooks 48 as in the primary unit. However, since any untrimmed beans which may reach this unit for trimming will be smaller than those trimmed on the primary unit, the rods 47 are arranged in a relatively tighter pattern than the rods 22 of the primary unit. The actual weight of product (beans) passing through the secondary separating unit is only slightly less than the weight passing through the primary unit. Due to the primary cleaning in the first unit and the use of the air blast ahead of the secondary unit, the flow of beans will pass through a much more closely patterned range of hooks. The bars 24 are on 3 inch centers instead of on 6 inch centers as on the primary unit. Side plates 42 complete the structure defining the secondary separating zone 38, which is relatively shorter than the primary separating zone 8.

A tilted plate with a screen slot 52 therein is disposed between the discharge end of the retrieval conveyor 32 and the secondary separating zone 38. Directed against the screen 52 is the outlet of any conventional centrifugal blower 51 carried by the secondary unit 39 for the purpose of directing a continuous blast of air through the stream of beans being discharged from conveyor 32, as at arrow D. Any air discharge stack 53 may be disposed above the secondary unit 39 so as to receive the air flow from the blower 51. A secondary trash discharge zone 54 corresponds to the primary zone 37, and final product discharge to subsequent processes is through zone 55 as at arrows F.

Before discussing the operation of the invention it may be assumed that the separator apparatus may be installed on the farm or at the processing plant. In the first case, product such as beans would be brought from the field in bags, crates and in many-ton loose bulk loads and unloaded onto the conveyor 1, with the "clean" product being deposited in recepticals from zone 55. In the second case, the product would be brought from the farm to the processing plant and deposited into hoppers (not shown) leading to the conveyor 1, with the "clean" product passing from zone 55 to some subsequent operation.

As the product is elevated on conveyor 1 it is discharged as at arrow A onto the vibrating dispersal plate 2. The source of oscillating power 6 can be a conventional motor and motion converter mechanism producing linear oscillating motion which is transmitted to plate 2 through connecting rod 5. The beans are vibrated off the plate in a continuous thin stream as at arrows B, through the acceleration distance, such that some beans fall substantially straight down while others strike a deflector plate 7. Plate 7 is carried by frame members 11 and is disposed at an angle to cause the beans to "spatter" into the primary separation zone 8. Single beans will fall through the maze of rods 22, which are also falling freely downwardly, onto the retrieval conveyor 32 below, along with some single vine leaves and weed blossoms which may have been picked along with the beans. Some of the beans will be in clusters of from two to six beans per forked stem, or may exist as a single bean on a forked stem. As these beans fall and tumble about downwardly in a tortuous path through the maze of freely falling rods 22, most or all of them will have the opportunity to, and in fact, do, catch on the rods 22. That is to say, a cluster straddles a rod, being caught thereon, and thereby separated from single beans. As the belt 21 and rods 22 move downwardly through separating zone 8, they turn around sprockets 15 into the trimming zone 30 where the rods 22 are then pointed downwardly such that the captive clusters thereon are caused to slide by gravity to the apex between the shank of the rod 22 and the hooked end 23, thus hanging away from the rods. As the rods 22 thence pass over the cutter blade assembly 31 in close proximity thereto as shown in FIG. 3, the single beans P are trimmed from the stems S which remain captive on the rods. The trimmed single beans P fall onto the retrieval belt 32. As the rods 22 move around the drive sprocket 16, they are pointed upwardly so that the hooks 23 open downwardly. The stems, vines and other trash caught thereon then falls off the hooks 23 through the discharge zone 37 to the refuse pile. The belt 21 and the rods 22, being endless, continues around throughout operation to provide continuous separation so long as the product is supplied from elevating conveyor 1.

Because neither beans nor any other product from the field is uniform in size and makeup in a given lot, and because some weed blossoms, leaves and the like are picked up with the beans, beans and bean clusters with relatively lighter makeup fall through to the retrieval conveyor 32 along with blossom and leaves. In actual practice, with the rods 22 being spaced approximately six inches apart along any given rank and offset on each of the next ranks to complete the repeat pattern forming the maze as is shown in FIG. 4, at least 70 percent of the clusters can be separated from a lot of beans, permitting only the beans of lighter makeup to pass through. By trading off considerations of increased length of the primary separation zone 8 against consideration of a secondary separation unit 39, it is found to be desirable to provide the second unit. However, in the second unit, rods 47 may be spaced somewhat closer together than in the primary unit, and the secondary separation zone 38 may be relatively shorter. Note also that the distance between dispersal plate 2 to the primary separation zone 8 provides a distance through which the falling beans can accelerate so as to "spatter" more effectively when they strike the rods 22. This acceleration distance is not required between the conveyor 32 and the secondary zone 38. The reason for not requiring the extra distance is that the air blast from the blower lifts the beans above the separating zone and spreads them sufficiently to attain the same results as secured by the longer "drop" in the primary unit.

FIG. 1 shows the beans dropping directly upon the screened outlet end of blower 51. Beans dropping in this manner build up a certain momentum which must be offset by the upward stream of air which requires just that much more air blast to operate and lowers the efficiency. To correct this the beans are dropped on the 6 inch angled plate 59 as shown in FIG. 6. This slows the momentum of the beans and they slide easily into the air stream from screened blower opening 52. If the beans are dropped directly against the screened blower opening 52, stem ends catch in the screen opening and build up so that the air flow is slowly stopped up. Sliding them from plate 59 onto the screened blower opening 52 lets the air blast lift them up instantly so that the separating of the remaining light material is facilitated.

In order to remove the blossoms, leaves and stems from the product a continuous stream of air is provided as at arrow D from the centrifugal blower 51 through the screened slot 52 which blows such trash through stack 53 and discharges same as at arrows E. The beans, being too heavy to be discharged, fall as at arrows C into the secondary separation zone 38.

The operation of the secondary unit 39 is identical to that of the primary unit 9. Falling bean clusters are caught on fall rods 47 and slide to the apex between the rod and hook 48 as the rods curve around the sprocket 44. The beans are trimmed from the stems at the cutter blade assembly 50 and discharged as at arrows F into the final discharge zone 55. The stems and the like fall off the hooks into the trash discharge zone 54 and finally to the refuse pile.

Thus the objects of the invention are achieved. Firstly, apparatus is provided for separating and trimming the product from trash and stem clusters, with the product being discharged to subsequent processes and the trash and stems being discharged separately as refuse. Through the use of a primary and secondary unit, product separation is carried out on two size scales to provide for natural variations in the makeup of the product and to guarantee completeness of the operation. Serious jam-ups of the rods are almost 100 percent prevented by the rods falling downwardly through a mass of similarly falling beans. If, by chance, such a plug-up occurs on a rod, it is cleared as the rod passes around a sprocket. The amount of beans that can be processed has been more than doubled.

A preferred embodiment having been shown and described, it is to be understood that the invention is to be construed within the true spirit and scope of the appended claims.

I claim:

1. Apparatus for separating and trimming clusters of beans or the like from their stems comprising upright frame members defining a separating zone, rods extending into said zone and movable downwardly through said zone, said rods catching bean clusters by their stems as they fall in a tortuous path through said zone, and for carrying the caught clusters to a trimming zone, feed means for dispersing beans into said separating zone, trimming means arranged below said rods for cutting the beans from the stems, retrieval conveyor means below said trimming means for retrieving single and cut beans, said rods being adapted to discharge the stems away from said conveyor means, and a source of power for said means.

2. Apparatus as in claim 1, sprockets carried adjacent the ends of said zone and drive sprockets connected to said source of power, and endless belt carried around said sprockets along said zone, said rods extending from the face of said belt.

3. Apparatus as in claim 1, said feed means comprising a vibrating plate arranged above said zone, said plate being adapted to receive beans from a conveyor and disperse the beans in a thin continuous stream into said zone.

4. An apparatus as in claim 1, sprockets carried adjacent the ends of said zone and drive sprockets connected to said source of power, an endless belt carried around said sprockets along said zone, said rods extending from the face of said belt, each said rod having a hook formed on the outer end thereof for holding the cluster stem in the trimming zone and dropping the stem away from said retrieval conveyor.

5. Apparatus for separating and trimming clusters of beans or the like from their stems comprising upright frame members defining a separating zone, upper and lower sprockets carried adjacent the ends of said zone and drive sprockets carried spaced behind and below said lower sprockets, and endless belt carried around said sprockets and along said zone, rods extending from the face of said belt into said zone and movable downwardly in the same direction as the falling clusters of beans through said zone, catching said bean clusters by their stems as they fall in a tortuous path through said zone, means for dispersing beans into said zone, trimming means arranged in a trimming zone formed below said lower and drive sprockets for cutting caught cluster beans from their stems, a retrieval conveyor arranged below said trimming means for retrieving single and cut beans, said rods being adapted to drop the stems away from said conveyor.

6. Apparatus as in claim 5, and blower means arranged adjacent the discharge end of said retrieval conveyor adapted to direct a stream of air through the beans being discharged.

7. Apparatus as in claim 5, and a second apparatus for separating and trimming relatively smaller clusters of beans comprising upright frame members defining a secondary separating zone adjacent the discharge end of said retrieval conveyor, a second set of sprockets and second endless belt carried therearound, second rods extending from said second belt into said secondary separating zone, and second trimming means arranged in a zone formed below said second set of sprockets and belt.

8. Apparatus as in claim 7, and blower means arranged between the discharge end of said retrieval conveyor and said secondary separating zone adapted to direct the stream of air through the beans before they enter said secondary separating zone.

References Cited

UNITED STATES PATENTS

| | | | |
|---|---|---|---|
| 717,345 | 12/1902 | Carnochan | 130—30 |
| 2,084,935 | 6/1937 | Bott | 130—30 |
| 3,059,648 | 10/1962 | Burton | 146—1 X |
| 3,115,170 | 12/1963 | Rodriguez et al. | 146—1 |

ANTONIO F. GUIDA, *Primary Examiner.*